United States Patent
Sakamoto et al.

(10) Patent No.: US 11,807,047 B2
(45) Date of Patent: Nov. 7, 2023

(54) WEAR AMOUNT ESTIMATION METHOD, WEAR AMOUNT ESTIMATION DEVICE, AND WEAR AMOUNT ESTIMATION PROGRAM

(71) Applicant: BRIDGESTONE CORPORATION, Tokyo (JP)

(72) Inventors: Masakazu Sakamoto, Tokyo (JP); Shoji Oida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 239 days.

(21) Appl. No.: 17/293,270

(22) PCT Filed: Nov. 19, 2019

(86) PCT No.: PCT/JP2019/045295
§ 371 (c)(1),
(2) Date: May 12, 2021

(87) PCT Pub. No.: WO2020/105641
PCT Pub. Date: May 28, 2020

(65) Prior Publication Data
US 2022/0001701 A1    Jan. 6, 2022

(30) Foreign Application Priority Data
Nov. 19, 2018   (JP) ................................. 2018-216320

(51) Int. Cl.
*B60C 23/04*      (2006.01)
*B60C 11/00*      (2006.01)
*B60C 11/24*      (2006.01)

(52) U.S. Cl.
CPC ........ *B60C 11/246* (2013.01); *B60C 23/0479* (2013.01); *B60C 23/0488* (2013.01); *B60C 23/0489* (2013.01); *B60C 2200/02* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 6,212,947 B1 | 4/2001 | Shimizu et al. |
| 2006/0201240 A1 | 9/2006 | Morinaga |

(Continued)

FOREIGN PATENT DOCUMENTS

| CN | 1455232 A | 11/2003 |
| CN | 1852814 A | 10/2006 |

(Continued)

OTHER PUBLICATIONS

International Search Report of PCT/JP2019/045295 dated Feb. 4, 2020 [PCT/ISA/210].

(Continued)

*Primary Examiner* — Andre J Allen
(74) *Attorney, Agent, or Firm* — Sughrue Mion, PLLC (57) ABSTRACT

A wear amount estimation method calculates a shearing force of each rib based on an average grounding pressure of each rib of an aircraft tire; calculates a wear energy of the aircraft tire based on the shearing force; and estimates the wear amount of the aircraft tire based on the wear energy and a wear resistance showing a relationship between a predetermined wear amount. The information related to the aircraft includes an internal pressure of the aircraft tire. The average grounding pressure of each rib is calculated based on the internal pressure and a wheel load applied to the aircraft tire.

7 Claims, 7 Drawing Sheets

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 223/00354; B60C 23/045; B60C 44/243; B60C 23/00354; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 13/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 13/002; G01M 3/04; G01M 7/02; G01M 9/06
USPC .................................................. 73/146–146.8
See application file for complete search history.

(56) References Cited

U.S. PATENT DOCUMENTS

2013/0036791 A1 2/2013 Shibata
2015/0375584 A1 12/2015 Makino et al.
2021/0080354 A1* 3/2021 Oida .................... G01M 17/02

FOREIGN PATENT DOCUMENTS

| CN | 101183402 A | 5/2008 |
| CN | 102770748 A | 11/2012 |
| CN | 206664169 U | 11/2017 |

(56) References Cited

FOREIGN PATENT DOCUMENTS

| JP | 11-326145 A | | 11/1999 | | |
|---|---|---|---|---|---|
| JP | 2013-35413 A | | 2/2013 | | |
| JP | 2013-113724 A | | 6/2013 | | |
| JP | 2013113724 A | * | 6/2013 | | |
| JP | 2014-28589 A | | 2/2014 | | |
| JP | 5778560 B2 | | 9/2015 | | |
| JP | 2016-008919 A | | 1/2016 | | |
| JP | 2019-105600 A | | 6/2019 | | |
| WO | WO-2014175102 A1 | * | 10/2014 | ............ | B60C 11/04 |
| WO | 2018/115675 A1 | | 6/2018 | | |
| WO | WO-2021172248 A1 | * | 9/2021 | ........... | B60C 11/246 |

OTHER PUBLICATIONS

Search Report dated Aug. 30, 2022 from The State Intellectual Property Office of P.R. of China in Application No. 201980076174.7.

Extended European Search Report dated Jun. 28, 2022 from the European Patent Office in EP Application No. 19886250.0.

* cited by examiner

WEAR AMOUNT ESTIMATION METHOD, WEAR AMOUNT ESTIMATION DEVICE, AND WEAR AMOUNT ESTIMATION PROGRAM

CROSS REFERENCE TO RELATED APPLICATIONS

This application is a National Stage of International Application No. PCT/JP2019/045295, filed Nov. 19, 2019, claiming priority to Japanese Patent Application No. 2018-216320, filed Nov. 19, 2018, the contents of all of which are incorporated herein by reference in their entirety.

TECHNICAL FIELD

The present invention relates to a wear amount estimation method, a wear amount estimation device, and a wear amount estimation program.

BACKGROUND ART

A technique is known that estimates a wear amount of aircraft tires (for example, Patent Literature 1). The method disclosed in Patent Literature 1 acquires plural kinds of wear energy corresponding to plural running states (such as a touching down state, a deceleration state after touching down, and a taxiing state) classified depending on the conditions of use, and estimates the wear amount of the respective aircraft tires based on the acquired wear energy.

CITATION LIST

Patent Literature

[Patent Document 1] Japanese Patent No. 5778560

SUMMARY OF INVENTION

Technical Problem

Generally, a plurality of aircraft tires are mounted on the aircraft. In the touching down state, the wear amount of each aircraft tire is different. For example, in the touching down state, the state (such as shearing force, slip rate) of each aircraft tire is not uniform because a load applied to each aircraft tire is different. However, since the method according to Patent Literature 1 does not consider the state of each aircraft tire in the touching down state, it is difficult to accurately estimate the wear amount of each aircraft tire in the touching down state.

To solve the conventional problem described above, the present invention provides a wear amount estimation method, a wear amount estimation device, and a wear amount estimation program capable of accurately estimating the wear amount of each aircraft tire in the touching down state.

Solution to Problem

A wear amount estimation method according to the present invention calculates a shearing force of each rib based on an average grounding pressure of each rib (rib 50 to 53) of an aircraft tire (aircraft tire 31); calculates a wear energy of the aircraft tire based on the shearing force; and estimates the wear amount of the aircraft tire based on the wear energy and a wear resistance showing a relationship between a predetermined wear amount. The information related to the aircraft includes an internal pressure of the aircraft tire. The average grounding pressure of each rib is calculated based on the internal pressure and a wheel load applied to the aircraft tire.

Advantageous Effects of Invention

According to the present invention, the wear amount of each aircraft tire in the touching down state can be accurately estimated.

DESCRIPTION OF EMBODIMENTS

Hereinafter, an embodiment of the present invention will be described with reference to the drawings. In the illustration of the drawings, the same constituents are denoted by the same reference signs, and description thereof is omitted.

(1) Configuration Example of Wear Amount Estimation System

Figure 1A:
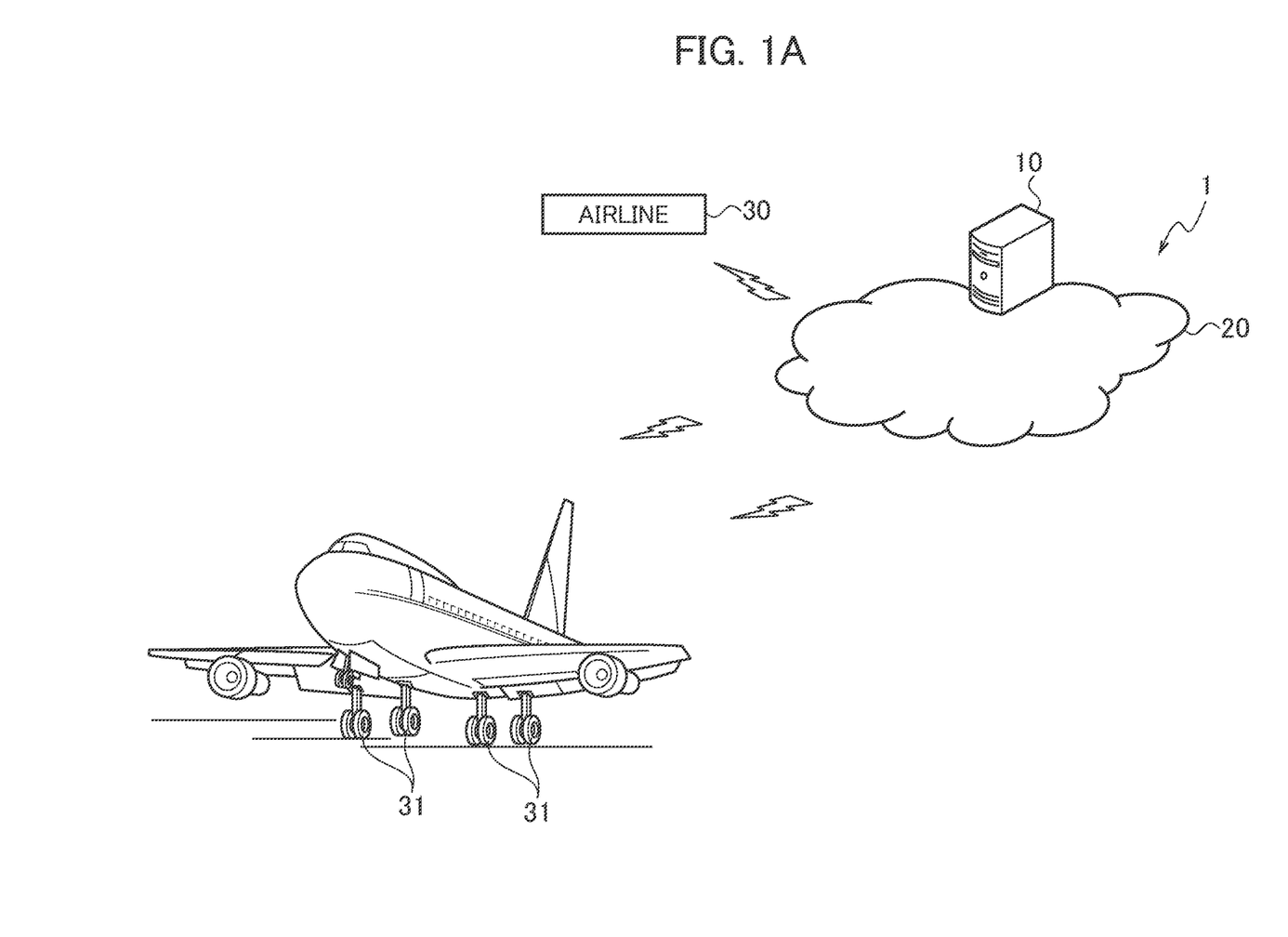
FIG. 1A is a schematic view showing a relation between a wear amount estimation device, a network, and an airline.

An example of a configuration of a wear amount estimation system 1 will be described with reference to FIG. 1A. As shown in FIG. 1A, the wear amount estimation system 1 includes a wear amount estimation device 10, a network 20, and an airline 30.

The wear amount estimation device 10 mutually communicates with the airline 30 via the network 20. Specifically, the wear amount estimation device 10 acquires pieces of information from the airline 30 via the network 20, and estimates wear amounts of a plurality of aircraft tires 31 mounted on an aircraft individually. A scene where the aircraft tire 31 is used includes a plurality of driving states. The wear amount estimation device 10 estimates the wear amount of the aircraft tire 31 in a touching down state. Details of the touching down state will be described later. The information acquired by the wear amount estimation device 10 from the airline 30 will also be described later. In the following, "aircraft" may be simply referred to as "airframe". The network 20 is a communication network capable of transmitting and receiving various kinds of information. For example, the network 20 is implemented by various types of communication lines, such as dedicated lines installed by telecommunications carriers, public switched telephone networks, satellite communication lines, and mobile communication lines.

Figure 1B:
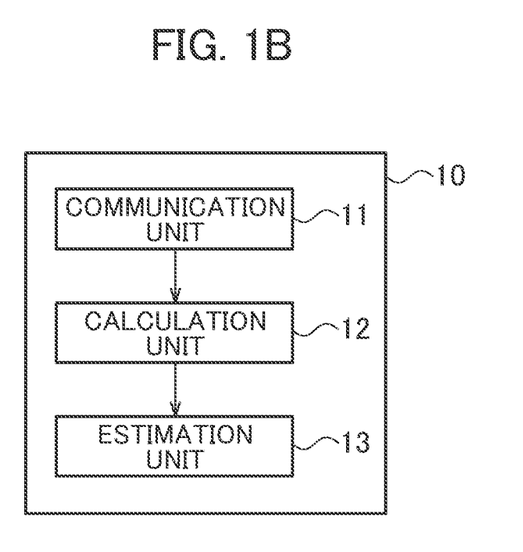
FIG. 1B is a schematic configuration diagram of the wear amount estimation device according to the present embodiment of the present invention.

The wear amount estimation device 10 is a general-purpose computer, for example, including a processor including a CPU and a memory such as a read-only memory (ROM) and a random-access memory (RAM). The CPU reads out a program stored in the ROM to the RAM and executes the program. The wear amount estimation device 10 may be either a built-in terminal device or a mobile terminal device easy to carry (such as a smartphone). The wear amount estimation device 10 may be a server. As shown in FIG. 1B, the wear amount estimation device 10 includes a communication unit 11, a calculation unit 12, and an estimation unit 13. The communication unit 11 is an interface connected to the network 20 to transmit/receive pieces of data to communicate with the airline 30. The calculation unit 12 calculates a wear energy of each aircraft tire 31 mounted on the aircraft. The estimation unit 13 estimates the wear amount of the aircraft tire 31 based on the wear energy calculated by the calculation unit 12. The communication unit 11, the calculation unit 12, and the estimation unit 13 can be fabricated in single or plural processing circuits. The respective processing circuits include a programmed processing device, such as a processing device including an electric circuit. The respective processing circuits include an application-specific integrated circuit (ASIC) configured to execute the functions described above or a device including circuit components.

In the present embodiment, the plurality of aircraft tires include an aircraft tire mounted on the main gear and an aircraft tire mounted on the nose gear. Further, a plurality of aircraft tires (six, for example) are mounted on the main gear. Also a plurality of aircraft tires (two, for example) are mounted on the nose gear. However, depending on the size of the aircraft, one aircraft tire may be mounted on the nose gear. The main gear may be referred to as a main landing gear. The nose gear may be referred to as a nose landing gear. The main gear and the nose gear are so-called landing gears, and include, in addition to the aircraft tires, a shock absorbing device for absorbing an impact load at the time of landing, a pedestal, or the like. Hereinafter, unless otherwise stated, the aircraft tire refer to each tire mounted on the aircraft. Hereinafter, aircraft tire is simply referred to as tire. Hereinafter, unless otherwise stated, the gear includes the main landing gear and the nose landing gear.

(2) Wear Amount Estimation Method

Figure 2:
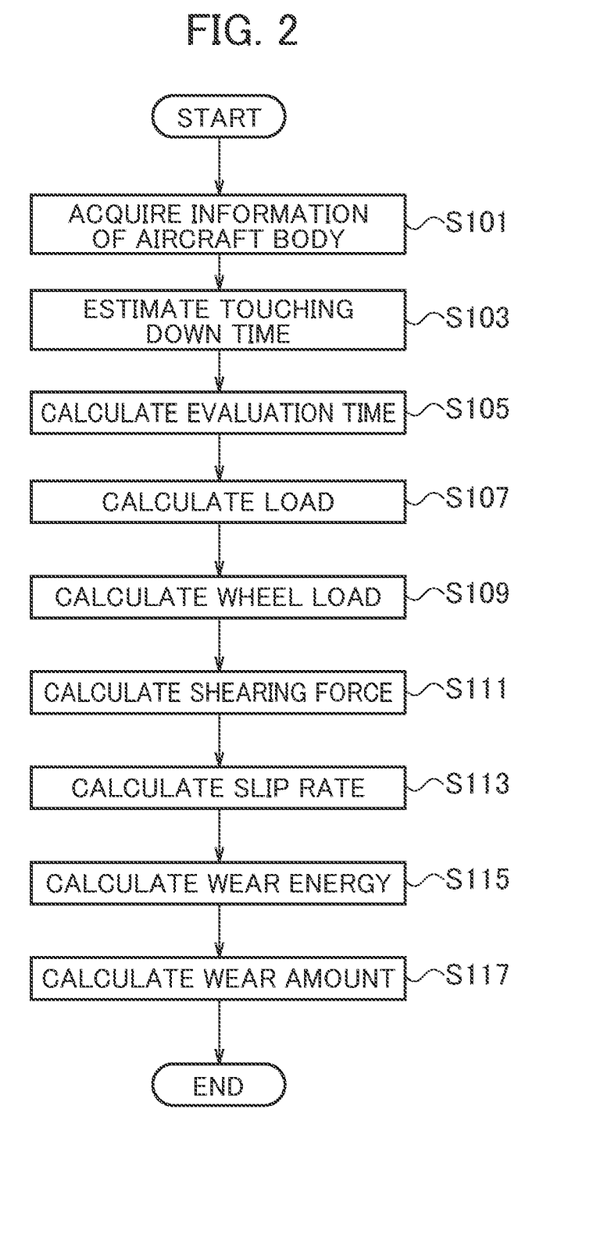
FIG. 2 is a flowchart for illustrating an operation of the wear amount estimation device according to the present embodiment of the present invention.

Next, referring to FIGS. 2 to 7, an example of a method for estimating the wear amount will be described. FIG. 2 is a flowchart for explaining an operation example of the wear amount estimation device 10.

In step S101 shown in FIG. 2, the wear amount estimation device 10 acquires information related to the aircraft from the airline 30. Specifically, the wear amount estimation device 10 acquires a speed of the aircraft (including a descending speed of the aircraft), an acceleration of the aircraft, a current position of the aircraft, an altitude of the aircraft, a direction of the nose of the aircraft, a total weight of the aircraft, an internal pressure of the tires mounted on the aircraft, position of ribs of the tires, a rotational speed of the tires, a pitch angle of the aircraft (including a pitch rate), a roll angle of the aircraft (including a roll rate), a gear structure of the aircraft, or the like. The wear amount estimation device 10 also acquires the time when these information is acquired. The rotational speed of the tire or the like may be acquired from an RFID tag attached to an inner surface of the tire. That is, all of the information used to estimate the wear amount need not be acquired from the airline 30. In the present embodiment, the internal pressure of the tire acquired from the airline 30 will be described as a measured value, however the present invention is not limited thereto. The internal pressure of the tire may be an estimated value.

The process proceeds to step S103, and the wear amount estimation device 10 estimates the touching down time of the tire. The touching down time means the time at the moment when the tire is grounded (the tire lands). The touching down time may be different between the tire mounted on the main gear and the tire mounted on the nose gear. Also, even in each tire mounted on the same main gear, the touching down time may be different depending on the mounted shaft position.

Figure 3:
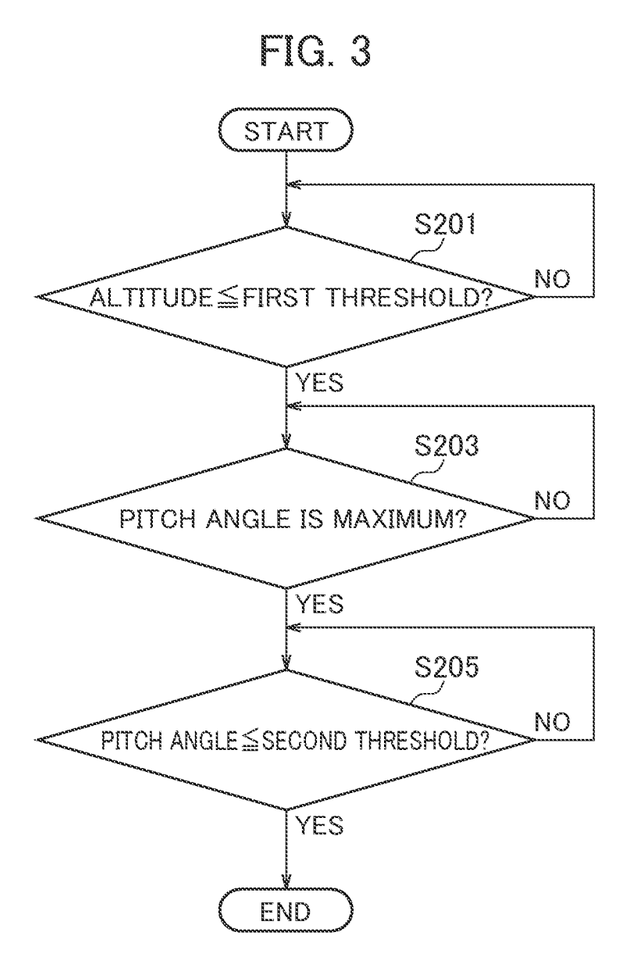
FIG. 3 is a flowchart for illustrating an operation of the wear amount estimation device according to the present embodiment of the present invention.
Figure 4:
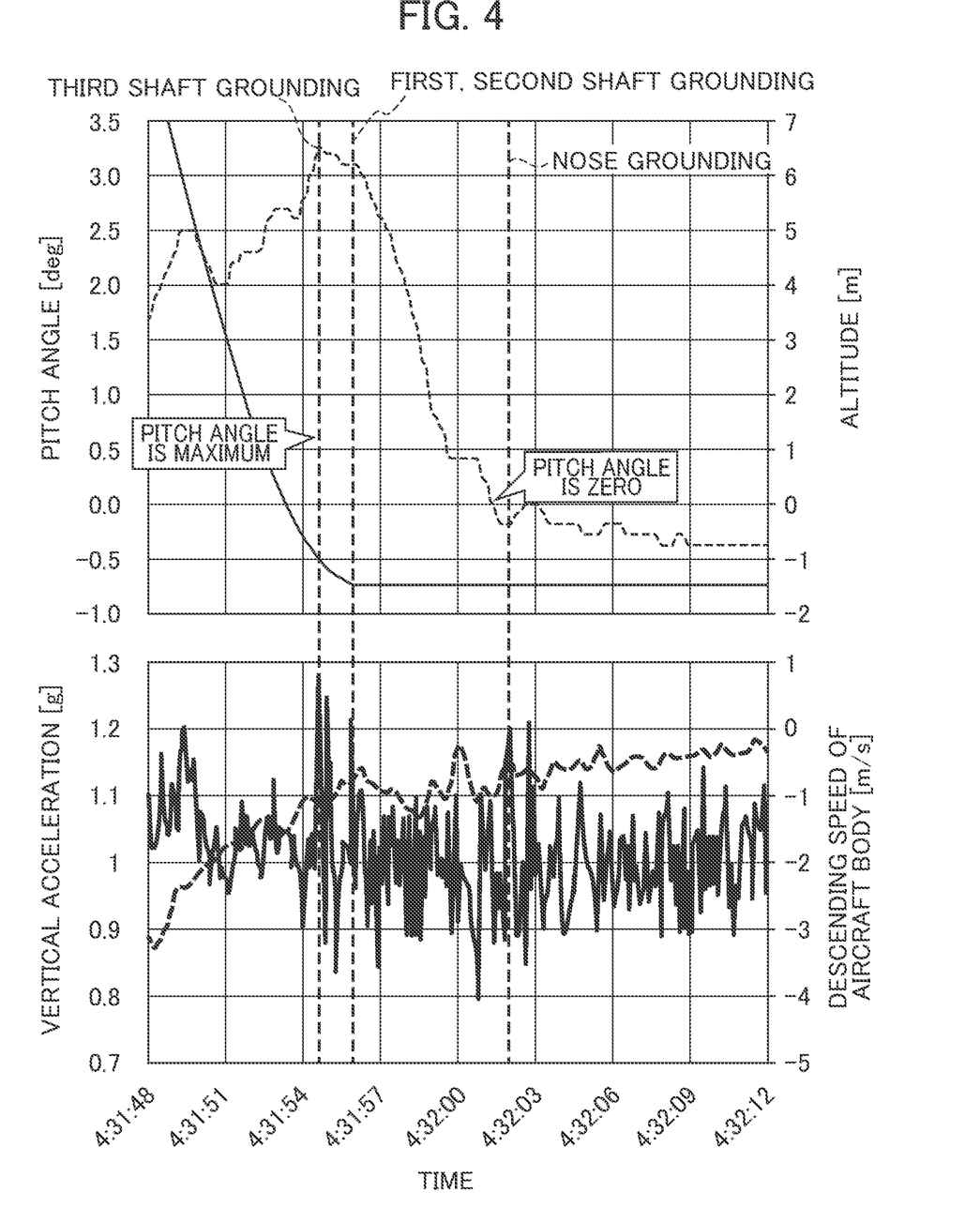
FIG. 4 is a graph showing the relationship between pitch angle and altitude.

A method of estimating the touching down time will be described with reference to FIGS. 3 and 4. First, in step S201 shown in FIG. 3, the wear amount estimation device 10 determines whether or not the altitude of the aircraft is less than or equal to a first threshold value. The first threshold value is not particularly limited, but is, for example, 10 m. When the altitude of the aircraft is less than or equal to the first threshold value, that is, when the aircraft approaches the ground, the process proceeds to step S203. The reason for comparing the altitude with the first threshold value is to avoid erroneous determination of touching down.

Generally, when the aircraft lands, the pitch angle of the aircraft gradually increases as the altitude decreases. In the present embodiment, the direction in which the nose (aircraft's nose) is directed upward is defined as "positive". Generally, the pitch angle becomes maximum the moment the aircraft lands and then decreases (refer to FIG. 4). Therefore, in step S203, the wear amount estimation device 10 determines that the tire is grounded when the pitch angle becomes maximum. However, not all tires are generally grounded at the same time. Generally, the tire mounted on the main gear is grounded first, and then the tire mounted on the nose gear is grounded. In addition, even each tire mounted on the same main gear may have different grounding timing. For example, in a case where the main gear is configured with first shaft, second shaft, and third shaft, each tire mounted on the third shaft is grounded first, and then the tire mounted on the first shaft and the second shaft is grounded (refer to FIG. 4). However, as shown in FIG. 4, the difference in the grounding time between the main gears (for example, the first shaft and the second shaft, and the third shaft) is very small and can usually be ignored. Therefore, the wear amount estimation device 10 may determine that the tire mounted on the main gear is grounded when the pitch angle is the maximum. As shown in FIG. 4, when the tire is grounded, a large acceleration is generated in the vertical direction of the aircraft due to the impact (impact on landing). Therefore, the wear amount estimation device 10 may determine that the tire mounted on the main gear is grounded when the pitch angle is maximum and the large acceleration is generated in the vertical direction of the aircraft.

The process proceeds to step S205, and the wear amount estimation device 10 determines that the tire mounted on the nose gear is grounded when the pitch angle is less than or equal to a second threshold value. The second threshold value is not particularly limited, but is, for example, 0 (zero) degrees. In the example shown in FIG. 4, the position of the pitch angle is 0 degrees and the grounding time (the touching down time) of the tire mounted on the nose gear are slightly different, this is because the vertical acceleration of the aircraft is taken into account. The wear amount estimation device 10 may determine that the tire mounted on the nose gear is grounded when the pitch angle is 0 degrees.

After estimating the touching down time, the process proceeds to step S105 shown in FIG. 2, and the wear amount estimation device 10 calculates an evaluation time. The evaluation time means a time to estimate the wear amount. Specifically, the evaluation time means a time from when the tire is grounded until the distance advanced by rotation of the tire and the distance that the aircraft advances become equal to. The evaluation time is a time during which the touching down state described above continues. In other words, the touching down state in the present embodiment means a state after when the tire is grounded until the distance advanced by rotation of the tire becomes substantially equal to the distance that the aircraft advances. However, as described later, the aircraft receives various forces during the touching down. In some cases, it is difficult to accurately calculate the evaluation time by the above definition.

Figure 5:
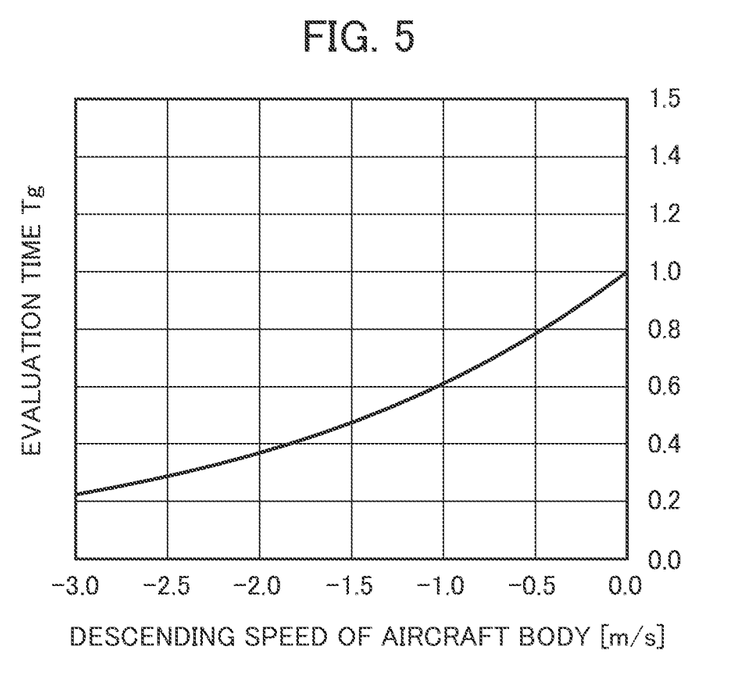
FIG. 5 is a graph showing the relationship between evaluation time and descending speed.

Therefore, the wear amount estimation device 10 according to the present embodiment calculates the evaluation time Tg based on the descending speed of the aircraft. An example of a method for calculating the evaluation time Tg will be described with reference to FIG. 5. FIG. 5 is a graph showing the relationship between the evaluation time Tg and the descending speed. In the touching down state, a violent shearing force accompanied by white smoke is generated by the tire is grounded to the road surface, and the shearing force becomes a torque to start the rotation. As shown in FIG. 5, the duration of the touching down state is 1 second or less, and about 1 second at the longest. The rotation of the tire is affected by the descending speed. As shown in FIG. 5, the evaluation time Tg becomes longer because the rotational speed of the tire slowly increases as the aircraft slowly descends. On the other hand, when the descending speed is fast, the rotational speed of the tire is also fast, so that the evaluation time Tg becomes short. Thus, the wear amount estimation device 10 calculates the evaluation time Tg based on the descending speed.

The descending speed is not constant in the touching down state. As shown in FIG. 4, the descending speed when the tire mounted on the main gear was grounded is different from the descending speed when the tire mounted on the nose gear was grounded. Therefore, the evaluation time Tg is different between the tire mounted on the main gear and the tire mounted on the nose gear. In each tire, the wear amount estimation device 10 estimates the wear amount of each tire until the evaluation time Tg based on the descending speed at the time of grounding elapses after the tire is grounded.

It is noted that the evaluation time Tg may be defined as a time from when the tire is grounded until the aircraft enters a taxiing state. The taxiing state is a state in which the aircraft runs on the runway using the power of the aircraft.

The process proceeds to step S107, and the wear amount estimation device 10 calculates a load applied to the tire. For example, when one tire is grounded on the road surface at the moment of touching down, the tire bears the total load of the aircraft. The load is determined by subtracting a lift from the total weight of the aircraft. The lift is determined by well-known methods.

The process proceeds to step S109, and the wear amount estimation device 10 calculates a wheel load applied to the tire. In the present embodiment, the wheel load is a weight to be borne by the tire, which is the same as the load described above, but the wheel load is a parameter in consideration of the characteristics and behavior of the aircraft relative to the load described above.

The characteristics of the aircraft include, for example, gear arrangement and gear structure. The gear arrangement relates to a position where the main gear and the nose gear are attached to the aircraft. The gear structure relates to the shaft position to which the tire is attached. The position of each gear or the load borne by the tire in each shaft varies. The load after the variation is defined as the wheel load.

The behavior of aircraft includes the lift, the roll angle, the roll rate, the pitch angle, and the pitch rate. The behavior of the aircraft also includes an impact load generated by the rotation of the gear structure and the bounce of the aircraft and the tire. The load borne by the tire is varied by the behavior of the aircraft. The load after the variation is defined as the wheel load. The behavior of the aircraft acquired by the wear amount estimation device 10 is in the touching down state.

In the touching down state, the aircraft receives various forces. Such forces vary depending on the characteristics and behavior of the aircraft. For example, the gear is deformed by the force acting up and down the aircraft. Thus, the wheel load of the tire is calculated according to where the tire is mounted in the gear. When fs is defined as a coefficient determined by where the tire is mounted in the gear, the wheel load is expressed by Formula 1.

[Math. 1]

$$\text{Wheel Load} = fs \times (\text{Total Weight} - \text{Lift}) \quad (1)$$

The lift is statically zero.

There are various types of aircrafts (size and shape), and the characteristics described above differ from aircraft to aircraft. When fd is defined as a coefficient determined by which aircraft the tire is mounted on, the wheel load is expressed by Formula 2.

[Math. 2]

$$\text{Wheel Load} = fs \times fd \times (\text{Total Weight} - \text{Lift}) \quad (2)$$

Statistically, left and right roll variations are assumed to have a median value of zero. When fr is defined as a coefficient determined by the behavior of the aircraft (left and right roll variations of the aircraft), the wheel load is expressed by Formula 3.

[Math. 3]

$$\text{Wheel Load} = fs \times fd \times fr \times (\text{Total Weight} - \text{Lift}) \quad (3)$$

In the present embodiment, the wear amount estimation device 10 calculates the wheel load using above Formula 3.

Figure 6:
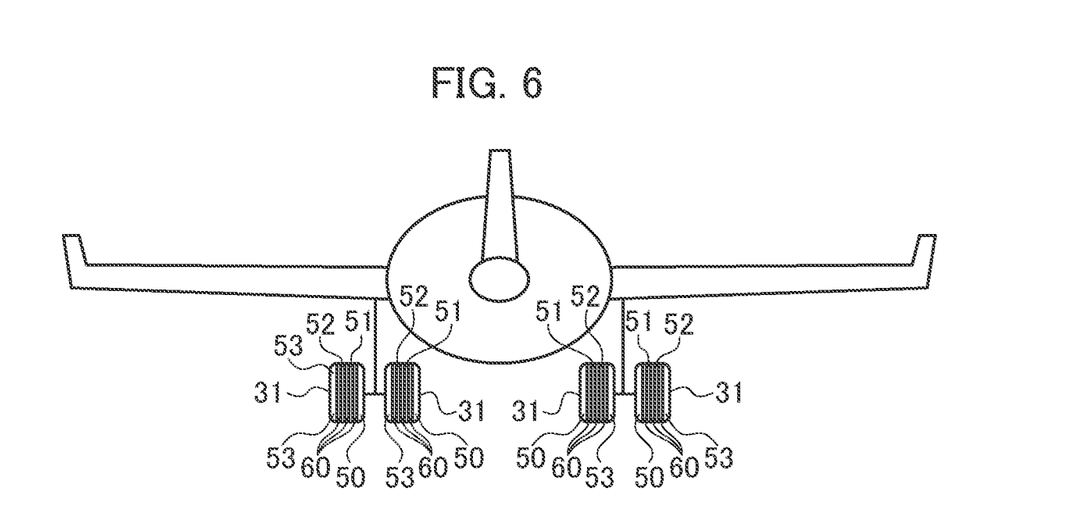
FIG. 6 is a back view illustrating circumferential grooves and ribs formed on the aircraft tires.

The process proceeds to step S111, and the wear amount estimation device 10 calculates the shearing force of the tire. As shown in FIG. 6, on the tread surface of the tire 31, a plurality of circumferential grooves 60 (in FIG. 6, there are three) extending along a tire circumferential direction are formed, and a plurality of ribs 50 to 53 (in FIG. 6, there are four) partitioned by the circumferential grooves 60 are formed. The ribs 50 to 53 are formed in the order of the ribs 50, 51, 52, 53 from the center side of the aircraft toward the outside of the aircraft. The shearing force depends on the position of the rib. In the prior art described above, it is assumed that each rib is grounded at a uniform pressure, but a grounding pressure distribution is actually generated. Therefore, in the present embodiment, the wear amount estimation device 10 calculates the shearing force of each rib by multiplying an average grounding pressure of each rib by a dynamic friction coefficient μ. Thus, the wear amount estimation device 10 can accurately calculate the shearing force of each rib. The average grounding pressure of each rib is calculated based on the wheel load of each rib and the internal pressure of each rib. The wheel load of each rib and the internal pressure of each rib are calculated by dividing the wheel load of the tire and the internal pressure of the tire by the number of ribs, for example. In the present embodiment, it is assumed that the average grounding pressure of each rib is calculated in advance. The average grounding pressure of each rib may be calculated based on an FEM model (Finite Element Method) of the tire. The road surface condition of each airport is different. It is assumed that the dynamic friction coefficient µ of the road surface of each airport is acquired in advance.

Figure 7:
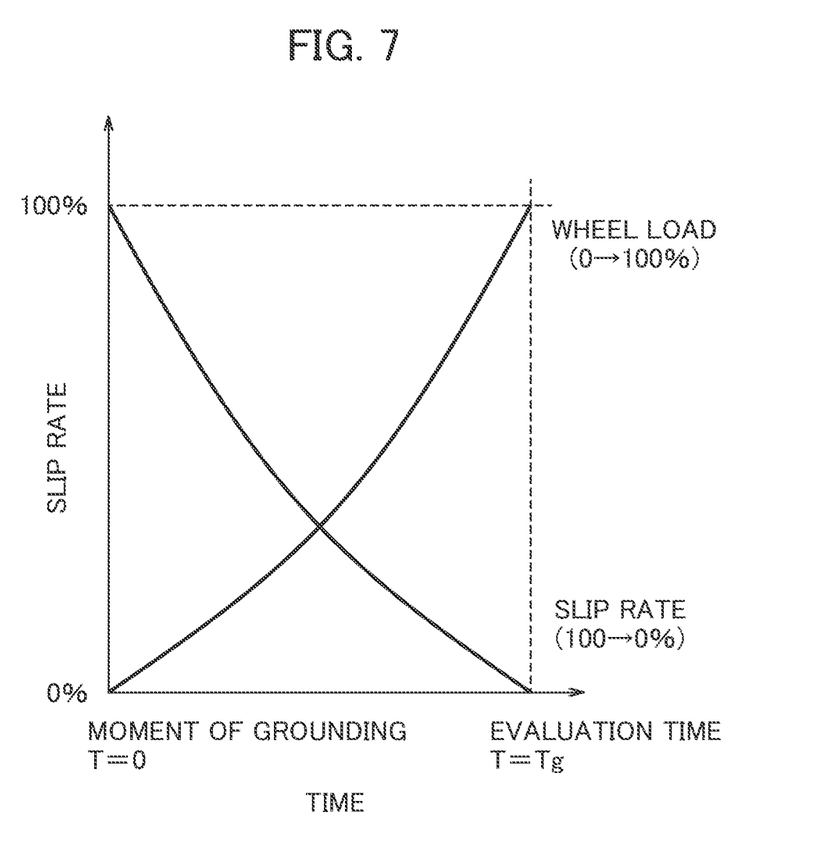
FIG. 7 is a graph illustrating an example of method of calculating slip rate.

The process proceeds to step S113, where the wear amount estimation device 10 calculates a slip rate in a rotational direction of the tire. Specifically, the wear amount estimation device 10 calculates the slip rate using a rotational speed of the tire. The wear amount estimation device 10 can acquire the rotational speed of the tire from the airline 30. The rotational speed of the tire is measured by a sensor mounted on the tire (or the aircraft). It is also possible that the rotational speed of the tire cannot be acquired. When the rotational speed of the tire cannot be acquired, the wear amount estimation device 10 may calculate the slip rate based on a laboratory test result. The laboratory test is, for example, a test in which conditions equivalent to those at the time of landing of the aircraft are given to the tire. The rotational speed information and the wheel load information are acquired by the laboratory test. FIG. 7 shows an example of the laboratory test result. As shown in FIG. 7, the wheel load and the rotational speed acquired by the laboratory test may be normalized in the section from the moment when the tire is grounded (T 0) to the evaluation time Tg, and the slip rate may be calculated by the normalized function. Furthermore Variations in the wheel load and the rotational speed are simulated by a monotonically increasing function, and the slip rate may be calculated by a function normalized in the section from the moment when the tire is grounded (T=0) to the evaluation time Tg.

Note that the example shown in FIG. 7 is not limited to the wheel load reaches 100% at the time Tg. Similarly, it is not limited to a decrease in the slip rate to 0% at the time Tg.

The process proceeds to step S115, and the wear amount estimation device 10 multiplies the slip rate by the shearing force and calculates an instant wear energy in a minute time. Then, the wear amount estimation device 10 calculates a wear energy by integrating the instant wear energy at the evaluation time Tg. The wear amount estimation device 10 estimates the wear amount based on the wear energy and a wear resistance showing a relationship between a predetermined wear amount. For example, the wear resistance is calculated by using the wear energy per flight calculated from the behavior of the aircraft of an average flight (airport to airport) and the wear amount per flight. The wear resistance described above is usually used in the taxiing state. Since the impact is large in the touching down state, the wear resistance smaller than the wear resistance described above may be used. In other words, in the touching down state, the wear resistance smaller than the wear resistance used in the taxiing state may be used.

(3) Working and Effects

As described above, the wear amount estimation device 10 according to the present embodiment acquires information related to the aircraft from the airline 30 and estimates the wear amount of the tire in the touching down state. Specifically, the wear amount estimation device 10 calculates the shearing force of each rib by multiplying the average grounding pressure of each rib of each tire by the dynamic friction coefficient µ. The information related to the aircraft includes the internal pressure of the tire. The average grounding pressure of each rib is calculated based on the internal pressure and the wheel load applied to the tire. The wear amount estimation device 10 calculates the wear energy of the tire based on the shearing force. The wear amount estimation device 10 estimates the wear amount of the tire based on the wear energy and the wear resistance showing the relationship between the predetermined wear amount. Thus, the wear amount estimation device 10 can accurately estimate the wear amount of each tire in the touching down state.

The information related to the aircraft includes the structure of the landing gear of the aircraft, the total weight of the aircraft, and the behavior of the aircraft in the touching down state. The wear amount estimation device 10 calculates the wheel load by using the Formula 3. Thus, the wear amount estimation device 10 can calculate the wheel load in consideration of the characteristics and behavior of the aircraft. Since the wheel load thus calculated is highly accurate, the wear amount estimation device 10 can accurately estimate the wear amount of each tire in the touching down state.

The wear amount estimation device 10 calculates the slip rate in the rotational direction of the tire based on the rotational speed of the tire. The wear amount estimation device 10 can accurately calculate the slip rate by using the actual rotational speed.

The wear amount estimation device 10 estimates the time during which the touching down state continues based on the descending speed. As described above, the evaluation time Tg becomes longer because the rotational speed of the tire slowly increases as the aircraft slowly descends. On the other hand, when the descending speed is fast, the rotational speed of the tire is also fast, so that the evaluation time Tg becomes short. The wear amount estimation device 10 can accurately estimate the time during which the touching down state continues by using the descending speed.

The wear amount estimation device 10 estimates the time when the touching down occurs based on the pitch angle. As in the above example, the wear amount estimation device 10 determines that the tire mounted on the main gear is grounded when the altitude is less than or equal to the first threshold value and the pitch angle becomes maximum. The wear amount estimation device 10 determines that the tire mounted on the nose gear is grounded when the altitude is less than or equal to the first threshold value and the pitch angle becomes 0 degrees. Thus, the wear amount estimation device 10 can accurately estimate the time when the touching down occurs for each tire. The wear amount estimation device 10 estimates the wear amount while the touching down state continues from the time when the touch-down occurs. Thus, since the touching down state is accurately divided from other running states (for example, taxiing state), the wear amount estimation device 10 can accurately estimate the wear amount of each tire in the touching down state.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

REFERENCE SIGNS LIST 1 wear amount estimation system
10 wear amount estimation device 11 communication unit
12 calculation unit
13 estimation unit
20 network
30 airline
31 aircraft tire
50 to 53 rib
60 circumferential groove

The invention claimed is:

1. A wear amount estimation method for estimating a wear amount of an aircraft tire including a plurality of ribs in a touching down state based on information related to the aircraft, the method comprising:
   calculating a shearing force of each rib of the plurality of ribs based on an average grounding pressure of the each rib;
   calculating a wear energy of the aircraft tire based on the shearing force; and
   estimating the wear amount of the aircraft tire based on the wear energy and a wear resistance showing a relationship between a predetermined wear amount;
   wherein the information related to the aircraft includes an internal pressure of the aircraft tire, and
   the average grounding pressure of the each rib is calculated based on the internal pressure and a wheel load applied to the aircraft tire.

2. The wear amount estimation method according to claim 1, wherein
   the information related to the aircraft includes structure of a landing gear of the aircraft, a total weight of the aircraft, and a behavior of the aircraft in the touching down state, and
   when fs is defined as a coefficient determined by where the aircraft tire is mounted in the landing gear, when fd is defined as a coefficient determined by the aircraft on which the aircraft tire is mounted, when fr is defined as a coefficient determined by the behavior, the wheel load is calculated according to the following formula 1:

[Math 1]

$$\text{Wheel Load} = fs \times fd \times fr \times (\text{Total Weight} - \text{Lift}) \quad (1).$$

3. The wear amount estimation method according to claim 2, wherein
   calculating a slip rate in a rotational direction of the aircraft tire based on a rotational speed of the aircraft tire when the information related to the aircraft includes the rotational speed of the aircraft tire,
   calculating the slip rate based on a predetermined test result when the information related to the aircraft does not include the rotational speed of the aircraft tire.

4. The wear amount estimation method according to claim 1, wherein
   the information related to the aircraft includes a descending speed of the aircraft, and
   estimating a time during which the touching down state continues based on the descending speed.

5. The wear amount estimation method according to claim 4, wherein
   the information related to the aircraft includes a pitch angle of the aircraft,
   estimating a time when the touching down occurs based on the pitch angle, and
   estimating the wear amount while the touching down state continues from the time when the touching down occurs.

6. A wear amount estimation device comprising a controller that estimates a wear amount of an aircraft tire including a plurality of ribs in a touching down state based on information related to the aircraft,
   wherein the controller being configured to:
   calculate a shearing force of each rib of the plurality of ribs based on an average grounding pressure of the each rib;
   calculate a wear energy of the aircraft tire based on the shearing force; and
   estimate the wear amount of the aircraft tire based on the wear energy and a wear resistance showing a relationship between a predetermined wear amount;
   wherein the information related to the aircraft includes an internal pressure of the aircraft tire, and
   the average grounding pressure of the each rib is calculated based on the internal pressure and a wheel load applied to the aircraft tire.

7. A wear amount estimation program for estimating a wear amount of an aircraft tire including a plurality of ribs in a touching down state based on information related to the aircraft, the program causing a computer of a terminal device to execute the steps of:
   calculating a shearing force of each rib of the plurality of ribs based on an average grounding pressure of the each rib;
   calculating a wear energy of the aircraft tire based on the shearing force; and
   estimating the wear amount of the aircraft tire based on the wear energy and a wear resistance showing a relationship between a predetermined wear amount;
   wherein the information related to the aircraft includes an internal pressure of the aircraft tire, and
   the average grounding pressure of the each rib is calculated based on the internal pressure and a wheel load applied to the aircraft tire.

* * * * *